US008961662B2

(12) United States Patent
Hughes et al.

(10) Patent No.: US 8,961,662 B2
(45) Date of Patent: Feb. 24, 2015

(54) SEPARATOR ASSEMBLY

(71) Applicant: Hughes Specialty Services, Inc., Sayre, OK (US)

(72) Inventors: Jason L. Hughes, Elk City, OK (US); Shannon L. Jackson, Elk City, OK (US); James D. Wright, Elk City, OK (US)

(73) Assignee: Hughes Specialty Services, Inc., Elk City, OK (US)

( * ) Notice: Subject to any disclaimer, the term of this patent is extended or adjusted under 35 U.S.C. 154(b) by 182 days.

(21) Appl. No.: 13/683,114

(22) Filed: Nov. 21, 2012

(65) Prior Publication Data

US 2013/0139694 A1    Jun. 6, 2013

Related U.S. Application Data

(60) Provisional application No. 61/563,349, filed on Nov. 23, 2011.

(51) Int. Cl.
| | | |
|---|---|---|
| *B01D 19/00* | (2006.01) | |
| *C02F 1/20* | (2006.01) | |
| *B01D 17/02* | (2006.01) | |
| *B01D 17/12* | (2006.01) | |
| *C02F 1/40* | (2006.01) | |
| *C02F 101/32* | (2006.01) | |

(52) U.S. Cl.
CPC .............. *C02F 1/20* (2013.01); *B01D 17/0217* (2013.01); *B01D 17/12* (2013.01); *B01D 19/0052* (2013.01); *B01D 19/0063* (2013.01); *C02F 1/40* (2013.01); *C02F 2101/32* (2013.01); *C02F 2101/322* (2013.01); *C02F 2201/008* (2013.01); *C02F 2209/42* (2013.01)
USPC .............................................. 96/183; 95/253

(58) Field of Classification Search
CPC .............................. B01D 19/0057; C02F 1/20
USPC ................................ 96/183, 185, 186; 95/253
See application file for complete search history.

(56) References Cited

U.S. PATENT DOCUMENTS

| | | | | | |
|---|---|---|---|---|---|
| RE15,220 | E | * | 11/1921 | Lorraine | 96/163 |
| 1,490,462 | A | * | 4/1924 | Gill | 96/163 |
| 1,512,358 | A | * | 10/1924 | Neill | 96/163 |
| 1,513,294 | A | * | 10/1924 | Stigall | 96/163 |
| 1,533,744 | A | * | 4/1925 | Lorraine | 96/163 |
| 1,535,721 | A | * | 4/1925 | Gill | 96/163 |
| 1,567,313 | A | * | 12/1925 | Wilson et al. | 96/183 |
| 1,649,570 | A | * | 11/1927 | Chandler et al. | 96/163 |
| 4,424,068 | A | * | 1/1984 | McMillan | 95/243 |
| 4,428,839 | A | * | 1/1984 | Davies et al. | 95/253 |
| 4,626,360 | A | * | 12/1986 | Senyard et al. | 210/799 |
| 7,569,098 | B2 | * | 8/2009 | Oglesby | 95/253 |
| 2012/0253705 | A1 | * | 10/2012 | Chen et al. | 702/47 |

* cited by examiner

*Primary Examiner* — Duane Smith
*Assistant Examiner* — Douglas Theisen
(74) *Attorney, Agent, or Firm* — Dunlap Codding, P.C.

(57) ABSTRACT

A separator assembly comprises a vertical vessel including a fluid inlet for receiving a fluid including a gas, at least two liquids, and solids, at least two liquid outlets for discharging the liquids, a gas outlet at an upper end thereof for discharging gas, and a solids outlet at a lower end thereof for discharging solids. A baffle plate extends across the vessel, and cooperates with the vessel to define an upper section and a lower section, and has a first conduit extending downwardly so that liquids and solids may flow into the lower section, and a second conduit extending upwardly so that gases may flow from the lower section to the upper section. A backpressure valve is in fluid communication with the gas outlet and is configured to discharge gas while maintaining a selected level of pressure inside the vessel.

9 Claims, 3 Drawing Sheets

SEPARATOR ASSEMBLY

INCORPORATION BY REFERENCE

The entirety of U.S. Provisional Application Ser. No. 61/563,349, filed on Nov. 23, 2011, is hereby expressly incorporated herein by reference.

BACKGROUND

1. Field of the Inventive Concepts

The inventive concepts disclosed generally relate to fluid separators, and more particularly, but not by way of limitation, to four-phase vertical separators for use in oilfield operations.

2. Brief Description of Related Art

Shale gas production operations throughout the United States and all over the world increasingly rely on hydraulic fracturing as a completion process to stimulate natural gas production from shale formations. Hydraulic fracturing involves high-pressure injection of large quantities of water, along with sand, and other small amounts of chemical additives, into a well. The high-pressure water creates small fractures, or cracks, in the surrounding rock formation, and sand or other propant used wedges into the cracks and prevents them from closing up once the water pressure is removed. These cracks allow any gas entrapped in the shale formation to escape and be recovered at the wellhead, and ultimately sold to consumers.

Upon completion of a hydraulic fracturing process in a well, as a result of discontinuing the high-pressure water injection, a large portion of the injected water (from several thousand to millions of gallons) is recovered at the wellhead as flowback water. Such flowback water typically contains some liquid hydrocarbons, some gases dissolved in the water due to the high-pressures in the well, and some solids which may be the propant injected in the well, as well as sand/sediment, and drill cuttings, carried up by the flowback water.

The gases dissolved in the flowback water as a result of the high pressures created during the hydraulic injection are highly flammable and pose serious environmental hazards. The Hazardous Air Pollutants (HAP or HAPs) typically dissolved in or mixed with the flowback water comprise greenhouse gases, volatile organic compounds (VOC or VOCs), such as nitrogen oxides ($NO_x$), methane ($CH_4$), nitrous oxide ($N_2O$), carbon dioxide ($CO_2$), and liquid hydrocarbons, such as formaldehyde, benzene and chlorofluorocarbons (CFCs). VOCs are organic chemicals that have a high vapor pressure at ordinary, room-temperature conditions, and are especially problematic due to their tendency to readily dissolve in or mix with flowback water at high pressures, and to also readily evaporate from the flowback water at atmospheric pressures and ambient temperatures. Further, most VOCs are generally not immediately toxic, but instead have compounding long-term negative health effects on oilfield personnel and other persons and animals exposed to even low concentrations of VOCs for prolonged periods of times.

Due to the health and environmental hazards of HAPs and VOCs, stringent environmental laws and regulations have been enacted on the state (e.g., California Air Resources Board), federal (e.g., EPA, OSHA), and international levels, to minimize the emissions of HAPs, and VOCs in particular, into the environment during oilfield and other industrial and agricultural operations.

Conventional flowback water handling practice has been to flow wellstream fluids (e.g., flowback water) through a gas production unit, or to a direct-fired production separator, for a three-phase separation of the sales gas, the condensate/oil, and the flowback water, at sales gas pressure. Conventional gas production units operate at pressures between 100-1400 psig and typically dump the exiting flowback water directly to atmospheric storage tanks after the sales gas has been separated.

There are several problems inherent in this approach, including inadequate retention times in the production separator and the flashing off of gas at the condensate and flowback atmospheric tanks resulting from the large pressure drop (e.g., from about 1400 psig to atmospheric pressure of about 15 psi). Flash gases vented at flowback water and condensate storage tanks pose severe dangers of fires/explosions and environmental hazards of substantial amounts of HAPs emissions including VOCs.

In addition to environmental concerns, the costs associated with operating oil and gas wells are always a concern. In the oil and gas industry, some of the initial costs to an operator begin in the construction of the location and the cost of the surface damages paid out to the owners of the surface property. Due to the rising cost of land, some of these initial expenditures are cut back by merely building the oil and gas location to accommodate the particular equipment that will be necessary in the drilling, completion, and production portions of the well. This has caused a dramatic size decrease in the oil and gas pads being built today. The size of the equipment necessary to complete a well no longer constitutes the size in which the pad will be constructed, but rather, the size of the pad constructed will determine the amount and size of the equipment that can be used during the process of oil and gas exploration.

Due to these land conservation efforts and environmental concerns, a need exists for a separator assembly constructed in a space saving technique, which is transportable, and which is capable of handling large volumes of flowback water inherent in hydraulic fracturing operations, and to carry out a four-stage separation process without allowing substantial amounts of VOCs and HAPs to be emitted to the atmosphere. It is to such an apparatus that the inventive concepts disclosed herein are directed.

SUMMARY

The inventive concepts disclosed herein are directed to a vertical separator assembly for the separation of crude oil, produced water, natural gas, and sand in the completion and production process. Creating an environment such that all natural gas is captured and either incinerated or directed to a proper sales and metering point, while allowing little or none of the vapors to be emitted to the atmosphere. The separator assembly includes a vertically oriented vessel with a baffle system. In a first stage of separation, natural gas is passed through the baffle system before exiting the vessel to assure that any lingering fluid does not pass into the vent line but rather falls out to be separated in the later stages. The natural gas can then be used in conjunction with a backpressure valve to maintain a desired level of backpressure on the vessel. The backpressure would not only aid in the functionality of the vessel, but can also be used to place backpressure on the well bore, as is necessary in many flow testing operations to simulate pipeline sales, for example.

With the first stage of separation complete, all liquids and solids fall out and begin the vessel's seconds stage of separation. The fluid and sand slurry falls in a centrifugal fashion to the bottom of the vessel to as to create the separation to which the solids remain at the bottom of the vessel near a sand dump. At this point, the produced water and the crude oil begin the vessel's third and fourth stages of separation. The particular fluid separation may be maintained at desired levels in the vertical separator by dump systems with float style operators, for example. To control the emissions of harmful vapors, substantially all control operations may be carried out with compressed air rather than natural gas. The sheer capacity of the separator vessel alone may aid in the third and fourth stage separations, as the retention time of the fluid will allow the crude oil to migrate to upper level dump outlets as the water remains at lower level dump outlets inside the vessel, for example. At this point, substantially all water, oil, and sand can be dumped as desired and on a substantially consistent basis to containment areas of a customer's choice.

In one exemplary embodiment, the vessel may only take up an approximately an 8 feet by 8 feet square feet footprint. The vessel is a four-phase separator that will separate gas, oil, water, and sand. In one version, the vessel includes a 6 inch back pressure valve, such as a S/FMT Kimray valve, that releases pressure to a flare line and flare stack and/or tied into a meter run and sale gas line, for example. A pilot valve may sense the pressure on the vessel to open and close the backpressure valve in such a manner so as to release a substantial amount of pressure very quickly so that backpressure is not maintained on the well while in the process of drilling plugs to keep the well flowing freely. If too much backpressure is held on the well, debris may build up and the drill pipe may get stuck in the hole, for example. The vessel can handle fluid volumes up to 350 bbl per hour and handle 500 mmcf of gas per day in some exemplary embodiments of the inventive concepts disclosed herein. The inside structure of the vessel is configured to cause a swirling effect to separate the fluid from the gas. The gas also has a knock out mesh screen or mist suppressor pad, at the top of the vessel to collect any droplets of water that might be carried in the gas before it's released from the vessel. Also in this separation the sand may fall to the bottom of the vessel where it can be removed by opening a valve, for example. The sand may then be moved from the vessel to a half pit for easy cleanout and disposal. The Kimray 2200 SMT style dump valves and Wellmark controllers may remove fluid from the vessel into flowback or frac tanks for haul offs and accurate measuring, for example. This vessel may be skid-mounted and may be raised upright with a pole truck or crane for easy spotting of the equipment, for example.

In one aspect, the inventive concepts disclosed herein are directed to a separator assembly, comprising a vertical vessel including a fluid inlet for receiving a fluid including gas, at least two liquids, and solids, at least two liquid outlets for discharging the liquids that separate from the gas, a gas outlet at an upper end thereof for discharging gas that separates from the liquids, and a solids outlet at a lower end thereof for discharging solids that separate from the gas and the liquids. The separator further comprises a baffle plate assembly positioned within the vertical vessel, the baffle plate assembly having (1) a plate extending across the vessel at a position below the fluid inlet and above the liquid outlets so that the plate cooperates with the vessel to define an upper section and a lower section, the plate having at least two apertures; (2) a first conduit extending downwardly from the plate in alignment with one of the apertures in such a way that liquids and solids that pass into the upper section are able to flow from the upper section to the lower section, a lower end of the first conduit terminating at a position below the liquid outlets; and (3) a second conduit extending upwardly from the plate in alignment with the other aperture in such a way that the gases that separate from the liquids in the lower section are able to flow from the lower section to the upper section. The separator assembly further includes a backpressure valve in fluid communication with the gas outlet, the backpressure valve configured to discharge gas from the vessel while maintaining a selected level of pressure inside the vessel.

BRIEF DESCRIPTION OF THE DRAWINGS

Like reference numerals in the figures may represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION

Figure 1:
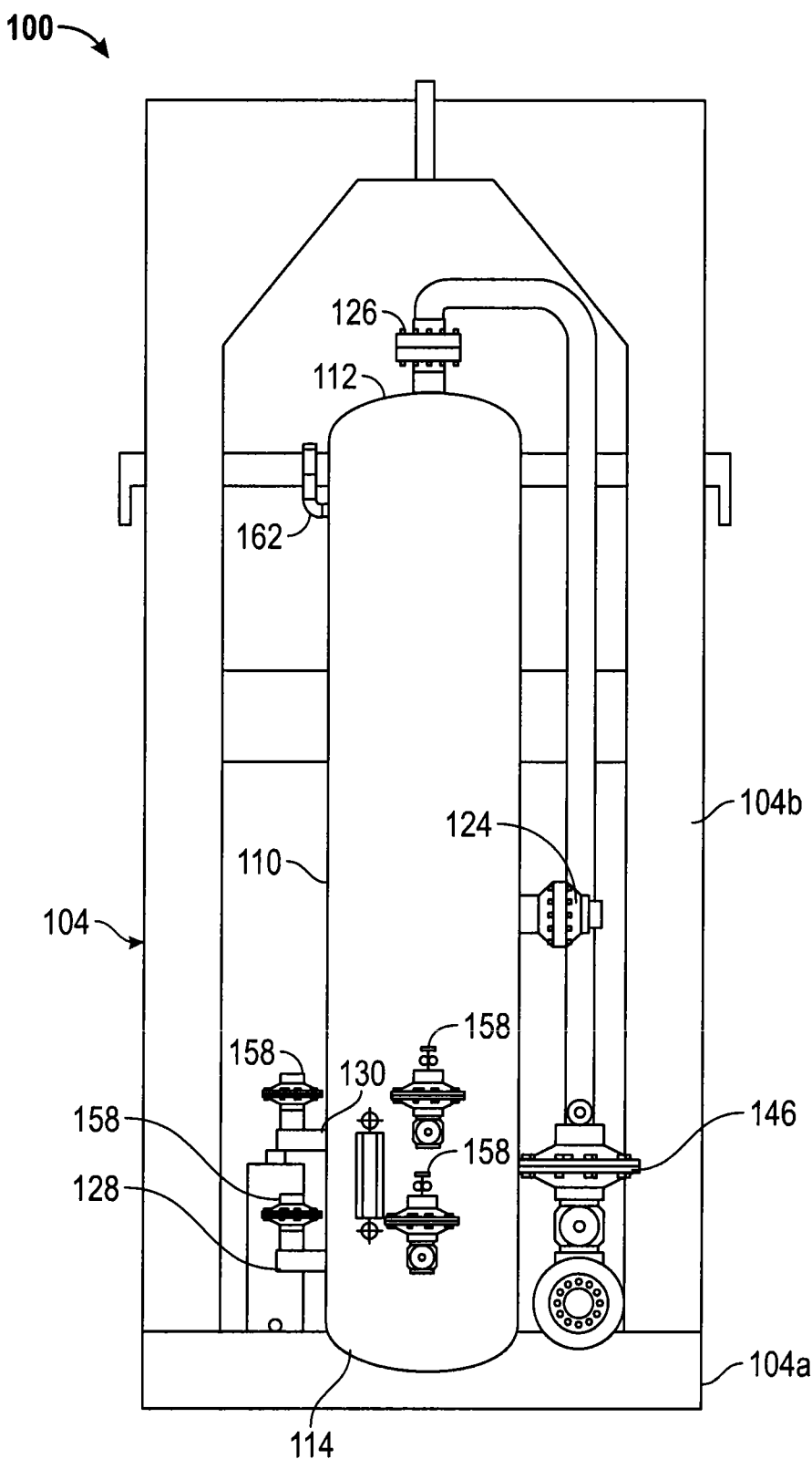
FIG. 1 is an elevational view of an exemplary embodiment of a separator assembly constructed in accordance the inventive concepts disclosed herein.
Figure 2:
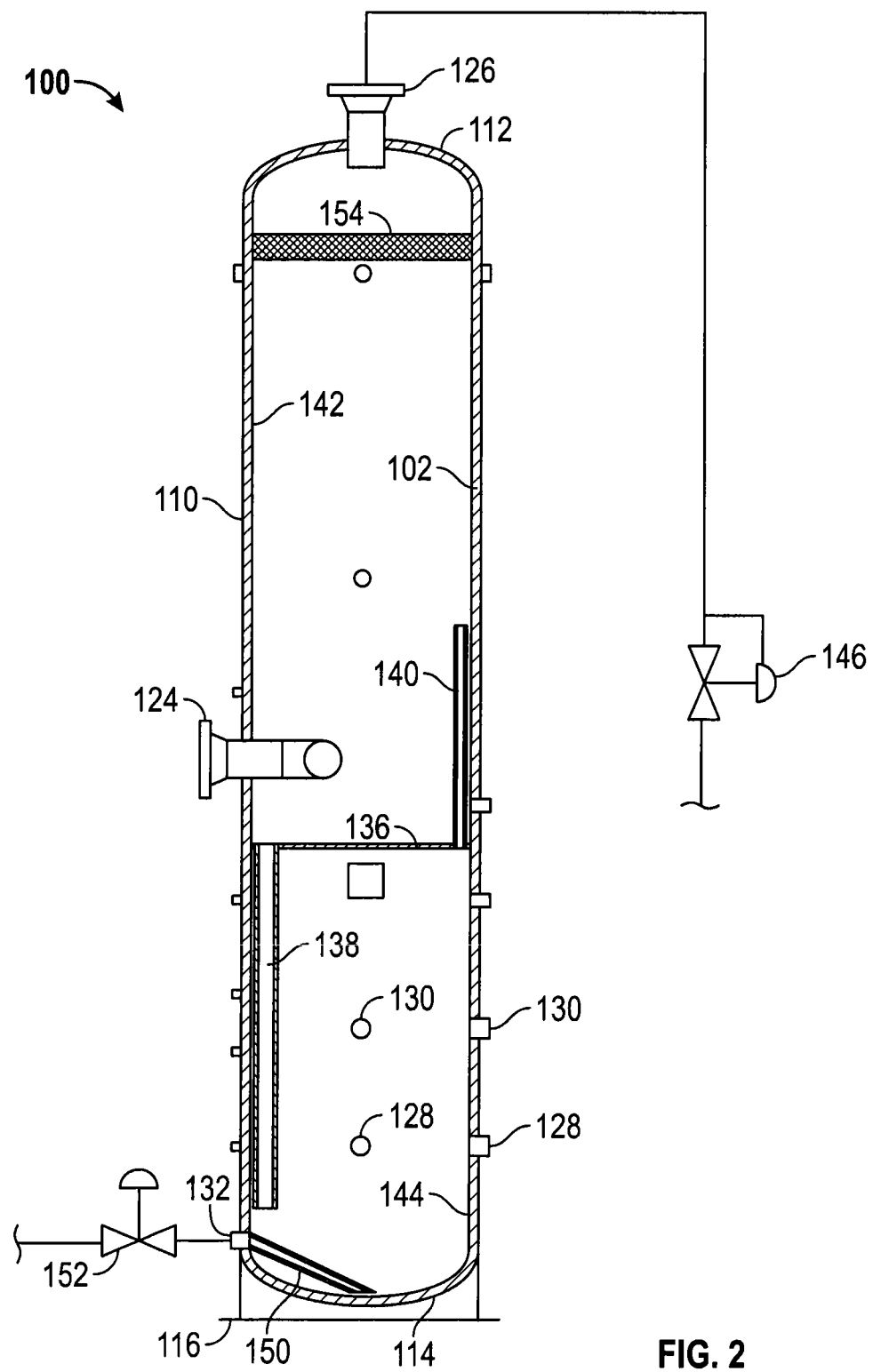
FIG. 2 is a partially diagrammatic, sectional view of the of the separator assembly of FIG. 1.
Figure 3:
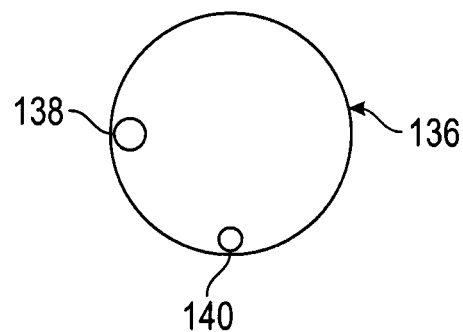
FIG. 3 is a top plan view of an exemplary embodiment of a baffle plate according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description only and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

The inventive concepts disclosed herein are generally directed to fluid separators and more particularly, but not by way of limitation, to a four-phase vertical separator configured to handle large volumes of flowback water and to carry out a four-stage separation process of gas, liquid, and solids from flowback fluids, without allowing substantial amounts of HAPs or VOCs to be emitted to the environment.

Unless expressly stated to the contrary, "or" refers to an inclusive "or" and not to an exclusive "or." For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to FIGS. 1-4, shown therein is an exemplary embodiment of a separator assembly 100 constructed in accordance with the inventive concepts disclosed herein. The separator assembly 100 may be configured to handle large volumes of flowback water recovered from a well site upon hydraulic fracture completion, for example. The separator assembly 100 may provide four-phase separation of solids, gas, oil, and water.

The separator assembly 100 includes a vertical vessel 102 configured to be moved from one well site to another. The vertical vessel 102 may be mounted on a skid 104. The skid 104 may include a base portion 104a and a vertical portion 104b, for example.

During the flowback stage of the hydraulic fracturing process, the separator assembly 100 may be implemented to replace a conventional gas-processing unit, by being fluidly connected with the well such that wellstream fluids or flowback water exiting the well may enter the separator assembly 100. It is to be understood that a separator assembly 100 may be implemented in any stage of oil well drilling or oil production, and may be specifically configured to handle large volumes of fluid, such as the large volumes of fluid recovered from a well during the flowback stage of the hydraulic fracturing process, for example.

Generally, the separator assembly 100 operates as follows: fluids enter the vertical vessel 102 where the fluids are directed downward towards the bottom of the vertical vessel 102. The vertical vessel 102 may operate at the sales gas pressure, for example. Sand, sediment, and liquids may settle to a bottom of the vertical vessel 102, while gasses, including natural gas (or sales gas), VOCs, and HAPs, may rise upward towards a top of the vertical vessel 102. Rising gases may travel through a mist suppressor to substantially eliminate mist, aerosolized liquids, or liquid droplets, and may exit the vertical vessel 102 in a pressure-regulated manner via a sales gas line (not shown), for example. The liquids inside the vertical vessel 102 are level controlled by, for example, one or more mechanical level control floats, and may be allowed to flow, in a pressure-regulated manner, into any desired containment vessel, container, or structure, for example. The liquids inside the vessel 102 may be level controlled by any suitable mechanism as will be recognized by persons of ordinary skill in the art having the benefit of the instant disclosure. Sand/sediment may be periodically blown off from the vertical vessel 102 via a valve, such as a pneumatic valve, and via one or more sand/sediment conduits positioned, for example, at the bottom of the vertical vessel 102.

The vertical vessel 102 may be implemented as a high-pressure four stage vertical vessel 102, to be operated at the sales gas pressure, for example. As used herein, the term "sales gas pressure" comprises a pressure, which may range from approximately 100 psig to approximately 1400 psig. Further as used herein, the abbreviation "psig" is to be understood to mean pounds per square inch gage, i.e., a unit of pressure which is relative to the atmospheric pressure surrounding the pressure gage. The psig measure is typically lower than the actual pressure inside the vertical vessel 102 by the pressure of the atmosphere surrounding the vertical vessel 102 (which is generally about 14.7 pounds per square inch at sea level), as will be understood by persons of ordinary skill in the art.

The vertical vessel 102 may be a high-pressure vessel having a sidewall 110, a top end 112, and a bottom end 114. The vertical vessel 102 may be connected, in part, to the skid 104 by a base flange 116 (FIG. 2), for example.

The vertical vessel 102 may be made of any suitable material capable of handling the pressure and abrasion likely to be encountered by the separator assembly 100. For example, the vertical vessel 102 may be constructed of steel, stainless steel, aluminum, or other metals, or non-metals, and combinations thereof. In an exemplary embodiment, the vertical vessel 102 may have a diameter of about 40 inches and a height of about 16-17 feet, and may be rated for maximum allowable working pressure (MAWP) of 1440 psig. In a non-limiting embodiment, the vertical vessel 102 may have an estimated liquid handling capacity of up to 350 bbl per hour and handle about 500 mmcf of gas per day, for example.

The top end 112 may be implemented as any desired top end 112, for example.

The vertical vessel 102 has a fluid inlet 124, a gas outlet 126, at least one water outlet 128, at least one oil outlet 130, and a solids outlet 132. An optional manifold (not shown) may be utilized upstream of the fluid inlet 124 to control the pressure and volume entering the vertical vessel 102. In addition, it will be appreciated that other components may be utilized in combination with the separator assembly 100, such as a sand separator (not shown), for example.

Figure 4:
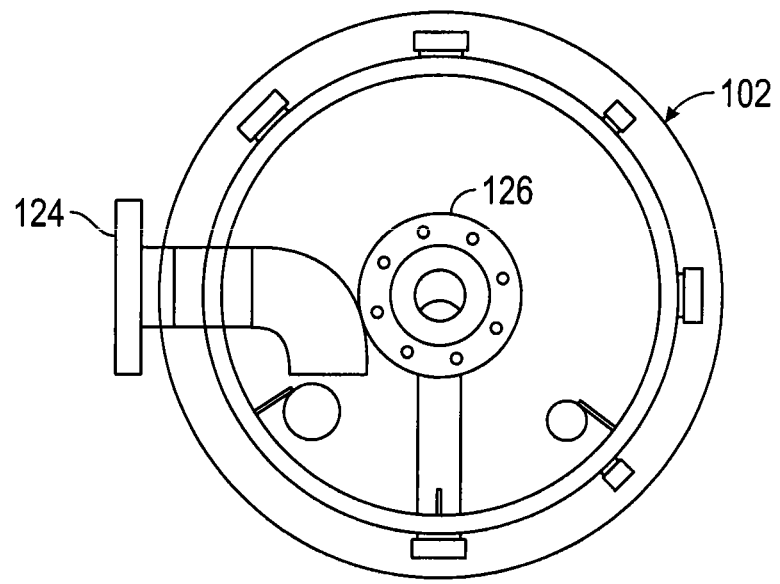
FIG. 4 is a top plan view of the separator assembly of FIG. 1 with the skid not shown for clarity.

The fluid inlet 124 functions to allow one or more fluids or mixtures of fluids to be transferred into the vertical vessel 102. The fluid inlet 124 may be angularly or tangentially arranged relative to the sidewall 110 as shown in FIGS. 1 and 4, to cause fluids entering the vertical vessel 102 via the fluid inlet 124 to travel in a vortical or spiraling pattern, for example.

The vertical vessel 102 is provided with a baffle plate 136, a liquid conduit 138, and a gas conduit 140. The baffle plate 136 is disposed inside the vertical vessel 102 so as to separate the vertical vessel 102 into an upper section 142 and a lower section 144. The upper section 142 and the lower section 144 are in fluid communication with one another via the liquid conduit 138 and the gas conduit 140, for example, so that fluids may flow from the upper section 142 into the lower section 144 via the liquid conduit 138, and so that gasses may flow from the lower section 144 into the upper section 142 via the gas conduit 140, for example. The baffle plate 136 may have at least two apertures in fluid communication with the liquid conduit 138 and the gas conduit 140, for example.

The fluid inlet 124 is positioned in the upper section such that fluids entering the vertical vessel 102 via the fluid inlet 124 may swirl within the upper section 142 such that gas and liquid are centrifugally separated from one another, for example. The separated gas travels upwardly toward the gas outlet 126 and the liquids are directed downward toward the lower section 144 and toward the bottom end 114 of the vertical vessel 102 via the liquid conduit 138. Additional gas that separates from the liquid in the lower section 144 passes back to the upper section 142 and toward the gas outlet 126 via the gas conduit 140.

The gas outlet 126 functions to allow gas to be transferred either to a sales line or to a combustor/flare line, for example. To ensure sufficient handling capacity, the gas outlet 126 may have a diameter of about six inches and may be provided with a valve 146 corresponding in size to maintain any desired backpressure within the vertical vessel 102. By way of example, the backpressure valve 146 may be a six-inch S/FMT KimRay valve 146. The backpressure valve 146 may be configured to open and close in such a manner to release a substantial amount of pressure very quickly so that backpressure is not maintained on the well while in the process of drilling plugs to keep the well flowing freely. As will be appreciated by persons of ordinary skill in the art having the benefit of the instant disclosure, if too much backpressure is held on the well, the debris may build up and the drill pipe may get stuck in the hole, for example.

The bottom end 114 of the vertical vessel 102 may be implemented similarly to, or differently from the top end 112. The bottom end 114 desirably comprises a sand blow-off conduit 150 (FIG. 2) formed therein, the sand blow-off conduit being in fluid communication with the solids outlet 132 such that sand and sediment may be periodically blown off, or transferred, from the vertical vessel 102 via a valve 152.

A mist pad 154 (FIG. 2) may be supported in the vertical vessel 102 below the gas outlet 126 and above the fluid inlet 124, for example. The mist pad 154 may be implemented as any conventional mist pad 154, and may function to absorb any mist, aerosolized liquids, or liquid droplets, while allowing gases to pass therethrough, such that gases may enter the gas outlet 126 substantially fee of liquids, for example. The design, placement, and implementation of the mist pad 154 may be based upon Gas Processing Suppliers Association separator design standards, as will be understood by a person of ordinary skill in the art having the benefit of the instant disclosure, for example.

Each of the water outlet 128 and the oil outlet 130 are provided with a liquid level controller 158. The liquid level controller 158 may be implemented as any desired liquid level controller 158, configured to maintain a preset level of liquid in the vertical vessel 102, and configured to transfer fluids from the vertical vessel 102 in a pressure-regulated manner. The transfer of fluids from the vertical vessel 102 driven by the pressure differential between the vertical vessel 102 and suitable storage vessels, for example. The liquid level controllers 158 are in fluid communication with the oil outlet 130 and the water outlet 128. The liquid level controllers 158 design, placement, and implementation may be based upon Gas Processing Suppliers Association separator design standards, as will be understood by a person of ordinary skill in the art having the benefit of the instant disclosure, for example.

The vertical vessel 102 may further comprise one or more optional pressure-relief valves 162 such that pressure may be released by the vertical pressure vessel 102 when a predetermined threshold pressure is exceeded inside the vertical vessel 102. To avoid releasing VOCs or other contaminants into the environment, such excess pressure may be released by allowing fluids or gases to escape the vertical vessel 102, and enter a combustor/flare line (not shown), where the fluids or gasses may be safely disposed of by combusting or flaring, for example.

The vertical vessel 102 may include an optional cleanout access (not shown) to permit access, cleaning, or maintenance of the interior and internal components of the vertical vessel 102, as will be appreciated by persons of ordinary skill in the art.

From the above description, it is clear that the inventive concepts disclosed herein are adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope of the inventive concepts disclosed herein.

What is claimed is:

1. A separator assembly, comprising:
    a vertical vessel including a fluid inlet for receiving a fluid including a gas, at least two liquids, and solids, at least two liquid outlets for discharging the liquids that separate from the gas, a gas outlet at an upper end thereof for discharging gas that separates from the liquids, and a solids outlet at a lower end thereof for discharging solids that separate from the gas and the liquids;
    a baffle plate assembly positioned within the vessel, the baffle plate assembly comprising:
        a plate extending across the vessel at a position below the fluid inlet and above the liquid outlets so that the plate cooperates with the vessel to define an upper section and a lower section, the plate having at least two apertures;
        a first conduit extending downwardly from the plate in alignment with one of the apertures in such a way that liquids and solids that pass into the upper section are able to flow from the upper section to the lower section, a lower end of the first conduit terminating at a position below the liquid outlets; and
        a second conduit extending upwardly from the plate in alignment with the other aperture in such a way that the gases that separate from the liquids in the lower section are able to flow from the lower section to the upper section; and
    a backpressure valve in fluid communication with the gas outlet, the backpressure valve configured to discharge gas from the vessel while maintaining a selected level of pressure inside the vessel.

2. The separator of claim 1, further comprising a portable skid on which the vertical vessel is mounted.

3. The separator of claim 2, wherein the skid comprises an area of about 64 square feet.

4. The separator of claim 3, wherein the skid comprises a horizontal base portion and a vertical portion extending upwardly from the base portion, and wherein the vertical vessel is mounted on each of the base portion and the vertical portion.

5. The separator of claim 1, wherein the backpressure valve is sized for a gas discharge capacity of about 500 mmcf of gas per day and a liquid discharge capacity of about 350 barrels per hour, while maintaining the pressure in the vessel at a sales gas pressure.

6. The separator of claim 5, wherein the sales gas pressure in a range from about 100 psig to about 1,400 psig.

7. The separator of claim 5, wherein gas outlet and the backpressure valve each have a diameter of about six inches.

8. The separator of claim 5, wherein the vertical vessel has a diameter of about 40 inches and a height in a range from about 16 feet to about 17 feet.

9. The separator of claim 1, wherein the liquid outlets include a plurality of water outlets and a plurality of oil outlets.

* * * * *